United States Patent
Hsieh et al.

[11] Patent Number: 5,816,604
[45] Date of Patent: Oct. 6, 1998

[54] STRETCHABLE AND FOLDABLE CART

[76] Inventors: Hung-Ching Hsieh; Yung-Shun Hsieh, both of No. 153, Sec. 2, Yung Hsing Rd., Lin 11, Tung Ning Tsun, Yuang Ching Hsiang, Chang Hua Hsien, Taiwan

[21] Appl. No.: 863,978

[22] Filed: May 27, 1997

[51] Int. Cl.$^6$ ...................................................... B62B 1/12
[52] U.S. Cl. .................. 280/655.1; 280/659; 280/33.997
[58] Field of Search .................................... 280/638, 639, 280/33.997, 651, 655, 655.1, 659, 652

[56] References Cited

U.S. PATENT DOCUMENTS

| | | | |
|---|---|---|---|
| 3,861,695 | 1/1975 | Shourek et al. | 280/659 |
| 4,895,381 | 1/1990 | Farlow | 280/33.997 |
| 5,639,109 | 6/1997 | Liang | 280/655.1 |

*Primary Examiner*—D. Glenn Dayoan
*Assistant Examiner*—Clovia Hamilton
*Attorney, Agent, or Firm*—David & Raymond; Raymond Y. Chan

[57] ABSTRACT

A stretchable and foldable cart whose handle bar can be stretched, retracted or folded by operation of a pressing rod associated with positioning elastic lugs, pins and stoppers. The loading stage of the car is able to adjust its size according to actual requirements by the operation of push button, positioning stoppers and connecting rods. The front and rear mountings of cart are made of plastics with sufficient engineering strength for reducing the cart weight yet without affecting the cart's functions; facilitating assembly work and reducing production cost.

1 Claim, 5 Drawing Sheets

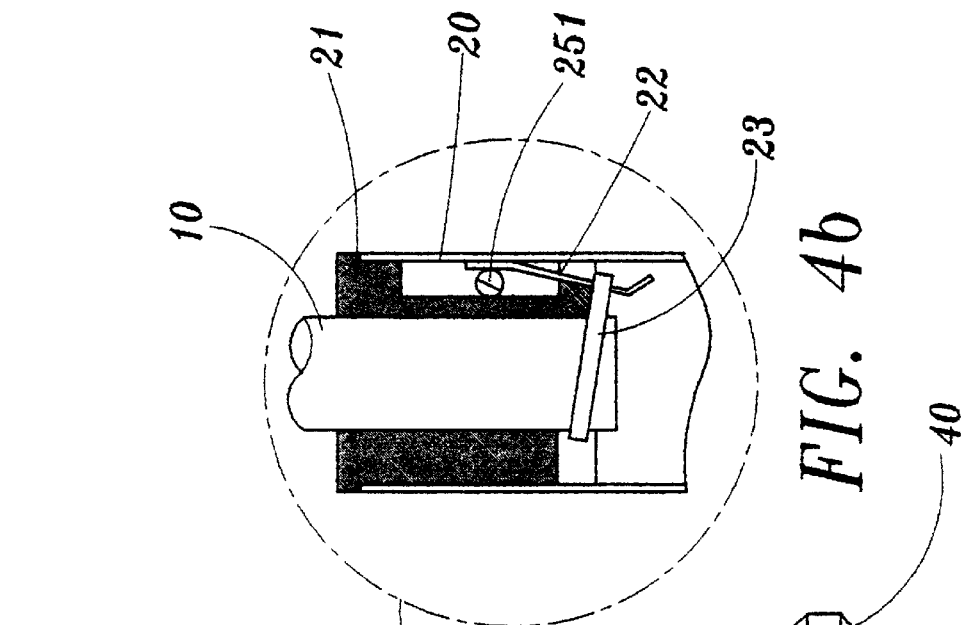
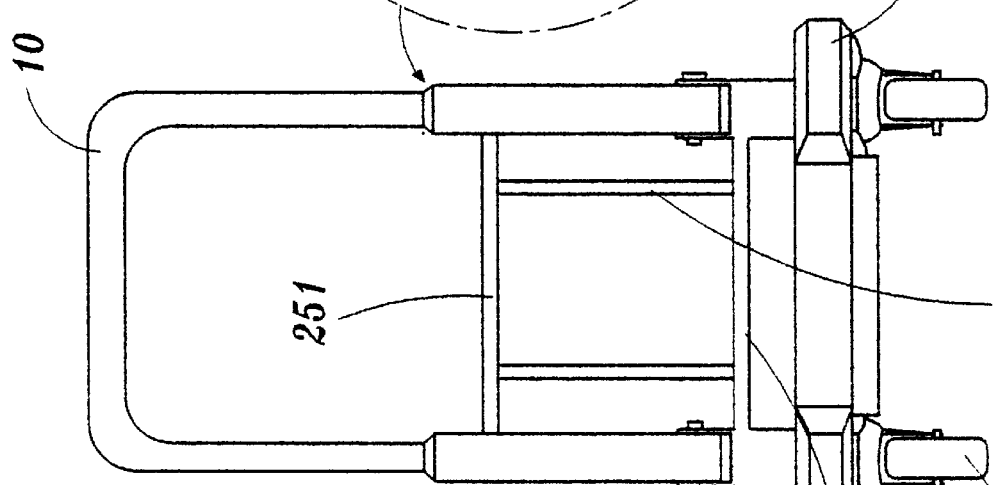
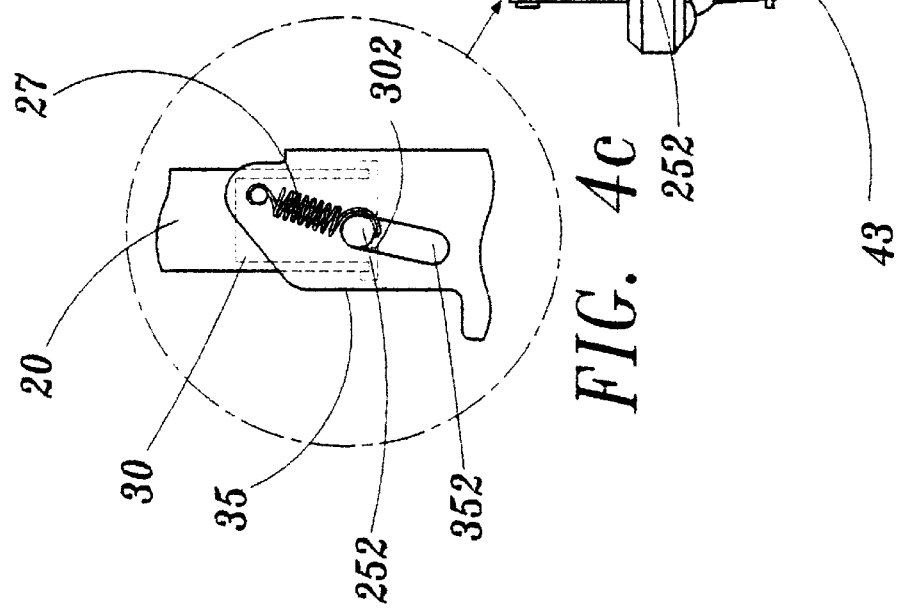
FIG. 4a
FIG. 4b
FIG. 4c

5,816,604

STRETCHABLE AND FOLDABLE CART

FIELD OF THE PRESENT INVENTION

The present invention relates to a stretchable and foldable cart which has a handle portion adapted to be stretched and retracted according to substantive requirement. Moreover, when the stretchable and foldable cart is not in use, it is foldable for easy storing. By operating a push button, pulling rods and positioning stoppers, the size of its loading stage can also be enlarged or reduced. The cart of the present invention that is a novel and practical transportation means, that has the advantages of easy operation, simple in construction and suitable for carrying loads in various sizes.

BACKGROUND OF THE PRESENT INVENTION

There are rare differences among the conventional foldable carts. If they are classified and compared according to loading ability portability, there will be some differences. For example, The portable foldable cart, ROC Patent No. 79208998 issued on May 11, 1991, can advantageously carry a heavy load with a convenient portability as well. The convenient portability is attained by providing two foldable portions, one at the central position of each lateral bar along its transverse direction. However, the size of the loading stage is unable to adjust according to different objects to be loaded. Moreover, the existence of too many foldable parts may possibly weaken the strength of the cart structure.

Another conventional foldable cart, ROC Patent No.83213639 issued on Jul. 21, 1995, has several disadvantages such that it can not carry a heavy load since it contains only two casters and the fixed type loading staged thereof is unable to adjust its size which greatly reduces the practicability of this cart.

As long as the above described inconveniences remain unsolved, the user must purchase a plurality of carts with different sizes in order to meet the different sizes of loads. It is uneconomical and embarrassing to the users.

SUMMARY OF PRESENT INVENTION

In order to rectify the existing disadvantages of the conventional foldable carts as described above, the applicant has been consistently and continuously making his efforts for developing an improved type of foldable cart. With his accumulated experiences and intelligent skills in the field, he finally comes out with a stretchable and foldable cart according to the present invention.

It is an object of the present invention to provide a stretchable and foldable cart which has a handle bar adapted to be stretched, retracted or folded according to substantial requirements by operating a pressing rod, positioning elastic lugs, pins and stoppers.

It is another object of the present invention to provide a stretchable and foldable cart loading stage is able to adjust its size according to the sizes of the objects to be loaded. The loading stage comprises a front and a rear mounting, two lateral bars, and square bushings etc. The load stage size is adjusted by the operations of the positioning stoppers in the bushings, in which the connecting rods are associated with a push button.

It is a further object of the present invention to provide a stretchable and foldable cart whose front and rear mountings are made of plastic with sufficient engineering strength for minimizing the cart weight without affecting cart functions, facilitating the assembly work and reducing the production cost.

BRIEF DESCRIPTION OF THE DRAWINGS

FIG. 4*a* is a left side view of the stretchable and foldable cart according to the present invention.

FIG. 4*b* is a handle bar enlarged view showing its stretching and retracting portions of the stretchable and foldable cart according to the present invention.

FIG. 4*c* is a handle bar enlarged view showing its folding portion of the stretchable and foldable cart according to the present invention.

DETAILED DESCRIPTION OF THE PREFERRED EMBODIMENT

Figure 1:
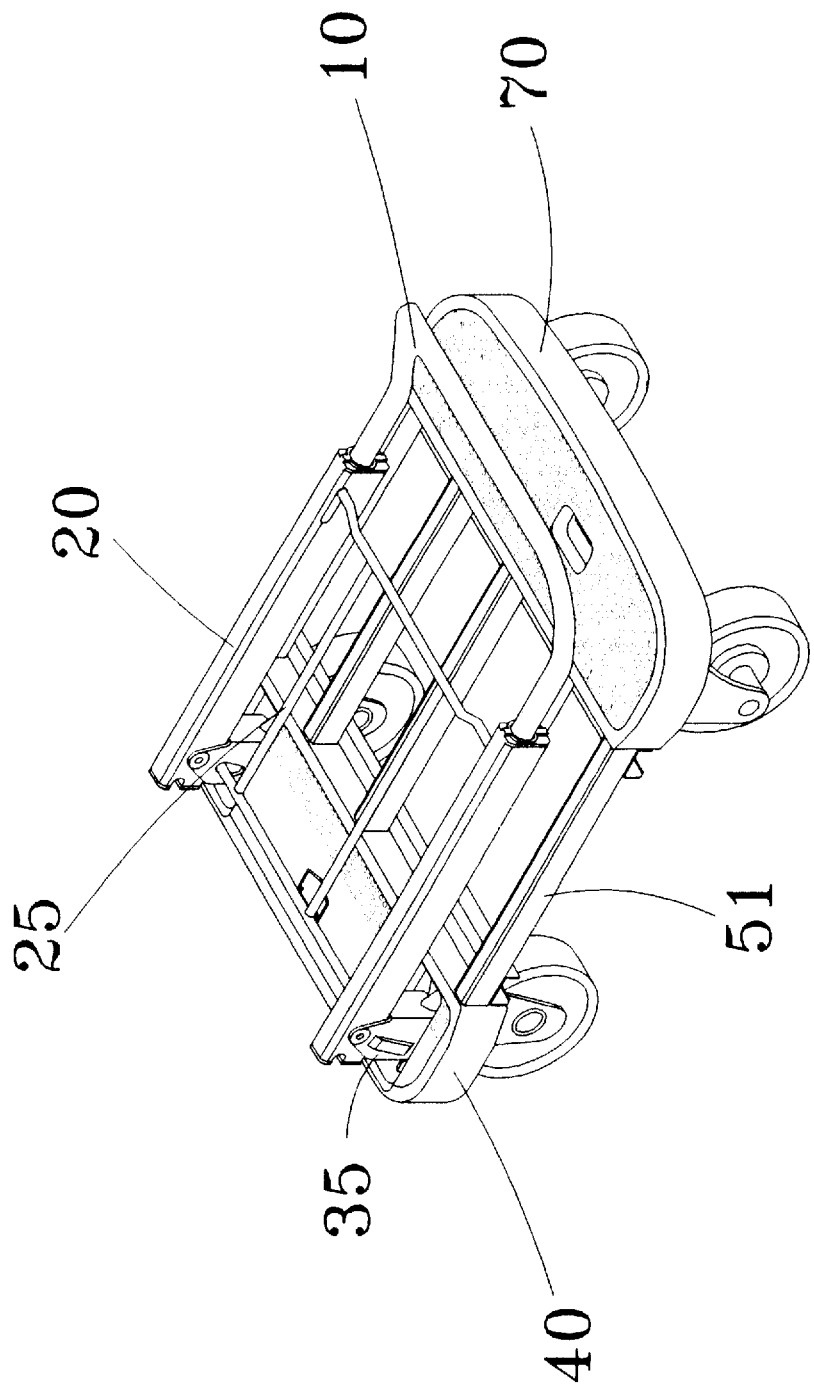
FIG. 1 is a three dimensional perspective view of the stretchable and foldable cart in folded state according to the present invention.

FIG. 1 shows a folded cart according to a preferred embodiment of the present invention, wherein both ends of a handle bar 10 are folded into a bushing 20 by operating a pressing rod 25. Afterwards, the handle bar 10 together with the bushing 20 is folded towards the surface of the loading stage with respect to a bushing base 35 as a fixed support by operating the pressing rod 25. The folding of the load stage is accomplished by inserting a square bushing 51 provided respectively for the front and back mountings 70 and 40 with each other mutually.

Figure 2:
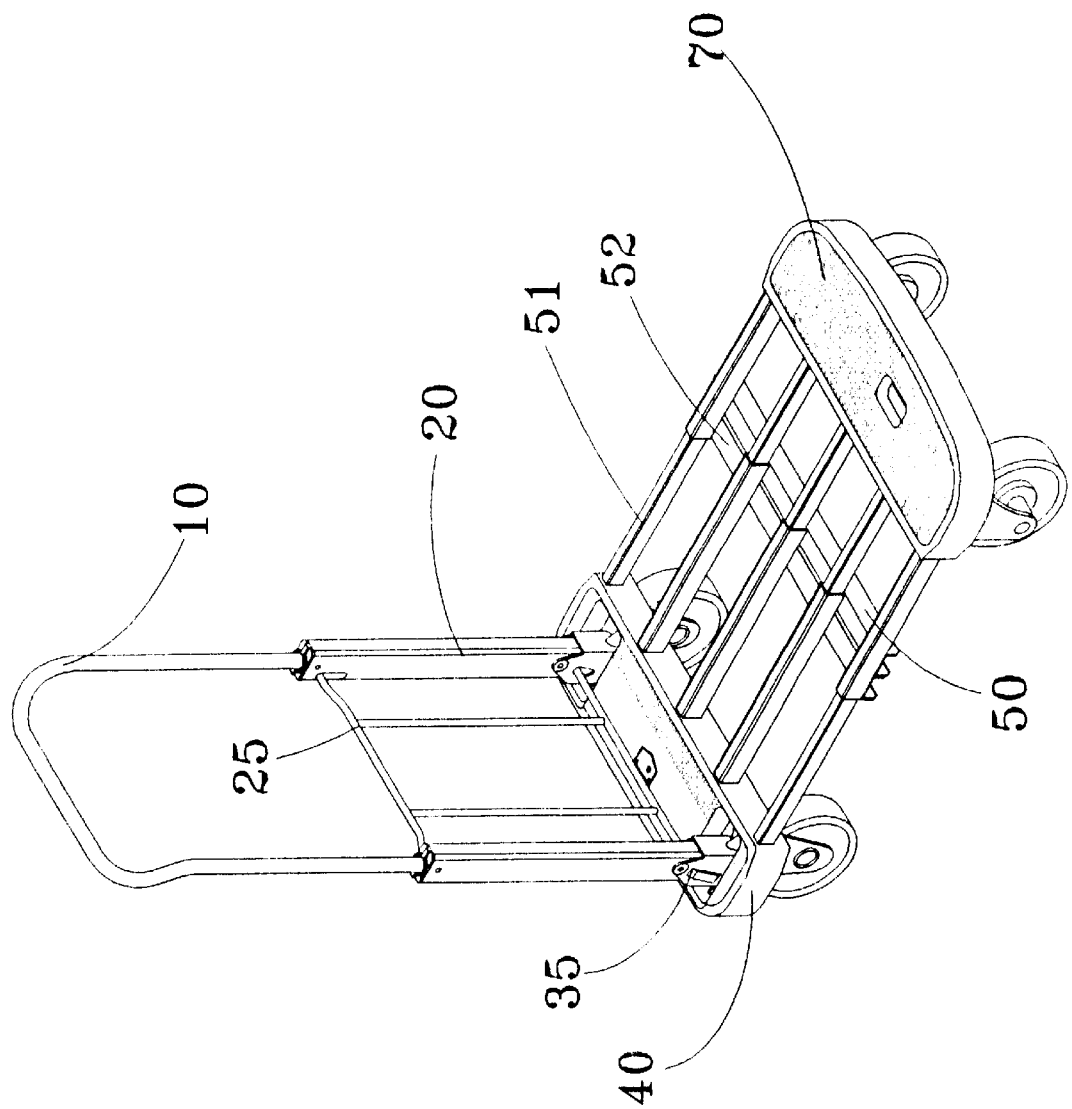
FIG. 2 is a three dimensional perspective view of the stretchable and foldable cart in developed state according to the present invention.

Referring to FIG. 2, the cart is in developed state according to the present invention, in which the handle bar 10 is pulled out of the bushing 20 and then stretches and extends together with the bushing 20 from the surface of the loading stage. The handle bar 10 is positioned and fixed at the required length by the bushing base 35 which is equipped at the lower end of the bushing 20. The loading stage may also be developed to an appropriate size according to the individual requirement of the object to be loaded by respectively extending the square bushing 51 for the front and back mountings 70 and 40 to each side up to the maximum position where lateral bars 50, 52 are interfered with each other.

Figure 3:
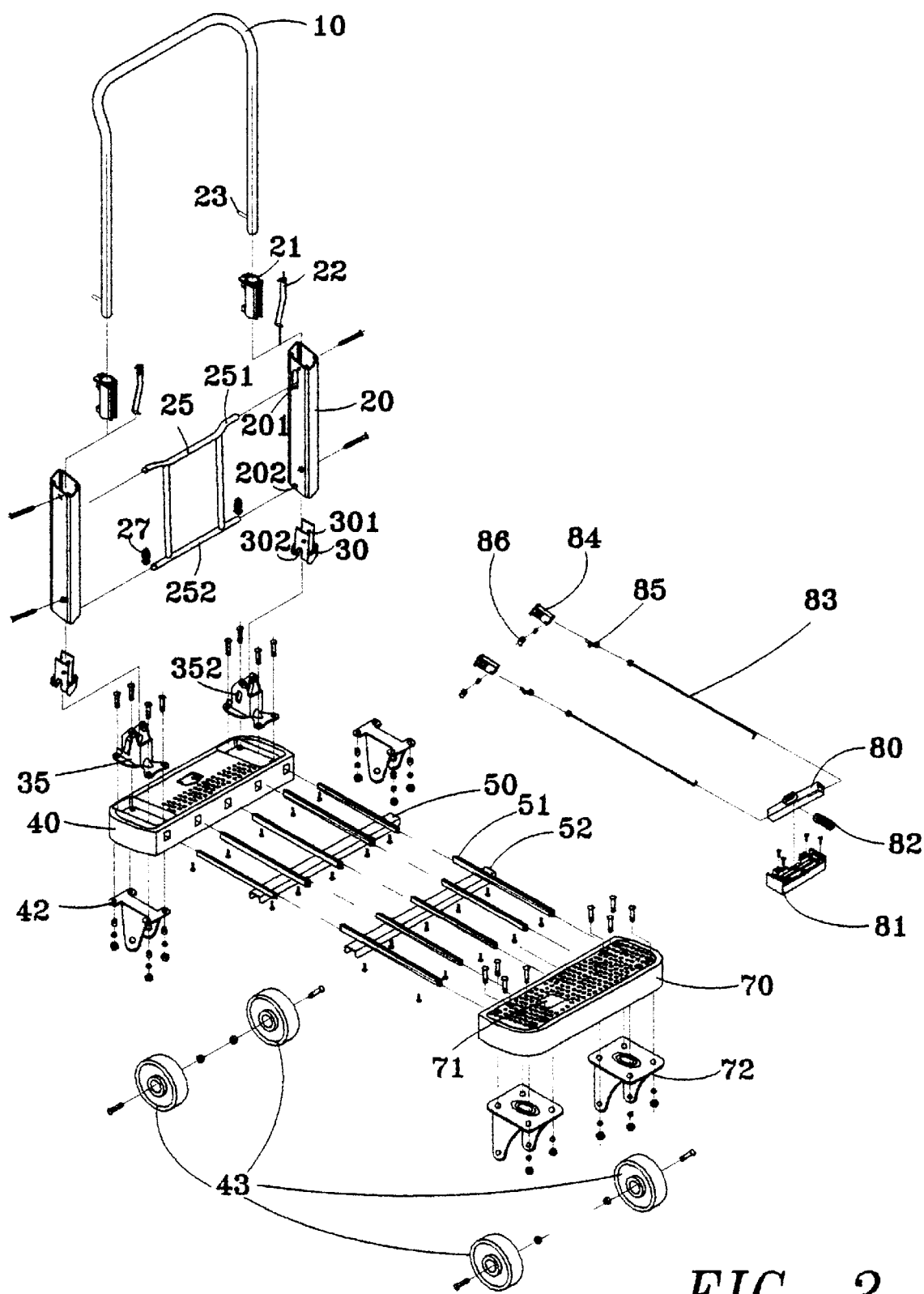
FIG. 3 is an exploded view showing the components of the stretchable and foldable cart according to the present invention.

Referring to FIG. 3, the components of the foldable cart according to the preferred embodiment of the present invention are illustrated, wherein the main structure of the cart comprises two parts, namely the handle bar unit and the loading stage unit. Stretching or folding of the handle bar unit is performed by those components including the handle bar 10, the bushing 20, lug bases 21, two positioning elastic lugs 22, two positioning pins 23, the pressing rod 25, springs 27, two positioning stoppers 30 and the busing bases 35. Further, in case the cart will not be using for a time being, the stretched handle bar 10 can be folded on the loading stage surface in order to save occupying space when put away. The loading stage unit comprises a front and a back mounting 70, 40, a pair of fixed caster holders 42, a pair of swiveling caster holders 72, casters 43, the lateral rods 50 and 52, the square bushings 51 and a control unit for developing and folding the loading stage. The pair of swiveling caster holders 72 and the pair of fixed caster holder 42 are installed under the front mounting 70 and rear mounting 40 for rotatably mounting the casters 43 respectively. A plurality of bushings 51 having different diameters are connected between the front and rear mountings 70 and 40 which are able to be inserted with respect to each other mutually. As a result, the distance between the front and rear mountings 70 and 40 can be determined. The structure of the loading stage is assembled by connecting the lateral bars 50 and 52 with the square bushings 50 50 as to support the front and rear mountings 70 and 40. The control unit for adjusting the size of the loading stage comprises a push button base 81, a spring 82, a push button 80, two connecting rods 83, two positioning stoppers 84, and their components (follower 85 and plungers 86 etc.).

FIGS. 3, 4a, 4b, and 4c illustrate showing the stretching, retracting and folding portions of the handle bar 10 according to the present invention. As shown in FIG. 4b, there is a lug base 21 provided at an upper end of the bushing 20. The handle bar 10 penetrates through a hollow part of the lug base 21. As the pressing rod is pressed down, two positioning elastic lugs 22 respectively provided on the two lug bases 21 are pressed by an upper rod 251 so that a positioning pin 23 protruded from each end of the handle bar 10 is engaged to a terminal of the positioning elastic lug 22 which trips out of its fixed position on the circular hole for allowing the handle bar 10 to stretch or retract. Then, referring to FIG. 4c, a lower end of the bushing 20 is engaged to a positioning stopper 30 and pivotally mounted on the bushing base 35. The pressing rod 25 has a lower rod 252 connected to the recessed slot 352 provided on each bushing base 35. The lower rod 252 is forcibly pulled upward and by resilient two springs 27 into another recess slot 302 of the positioning stopper 30 installed at the lower end of the bushing 20. The two springs 27 are mounted between two ends of the lower rod 252 and said two bushing bases 35 respectively. When it is desired to fold the handle bar 10 and the bushings 20, press the pressing rod 25 down and then its lower rod 252 is separated from the recess slot 302 of the position stopper 30. The purpose of folding the handle bar 10 and the bushing 20 is thus attained. On the contrary, if it is desired to pull up the handle bar 10 and bushing 20 to the extent approximately perpendicular to the loading stage, operate the lower rod 252 to enter into the recessed slot 302 of the positioning stopper 30 again in order to firmly fix the handle bar 10 by the restoring force of the spring 27 exerted on the pressing rod 27.

Figure 5:
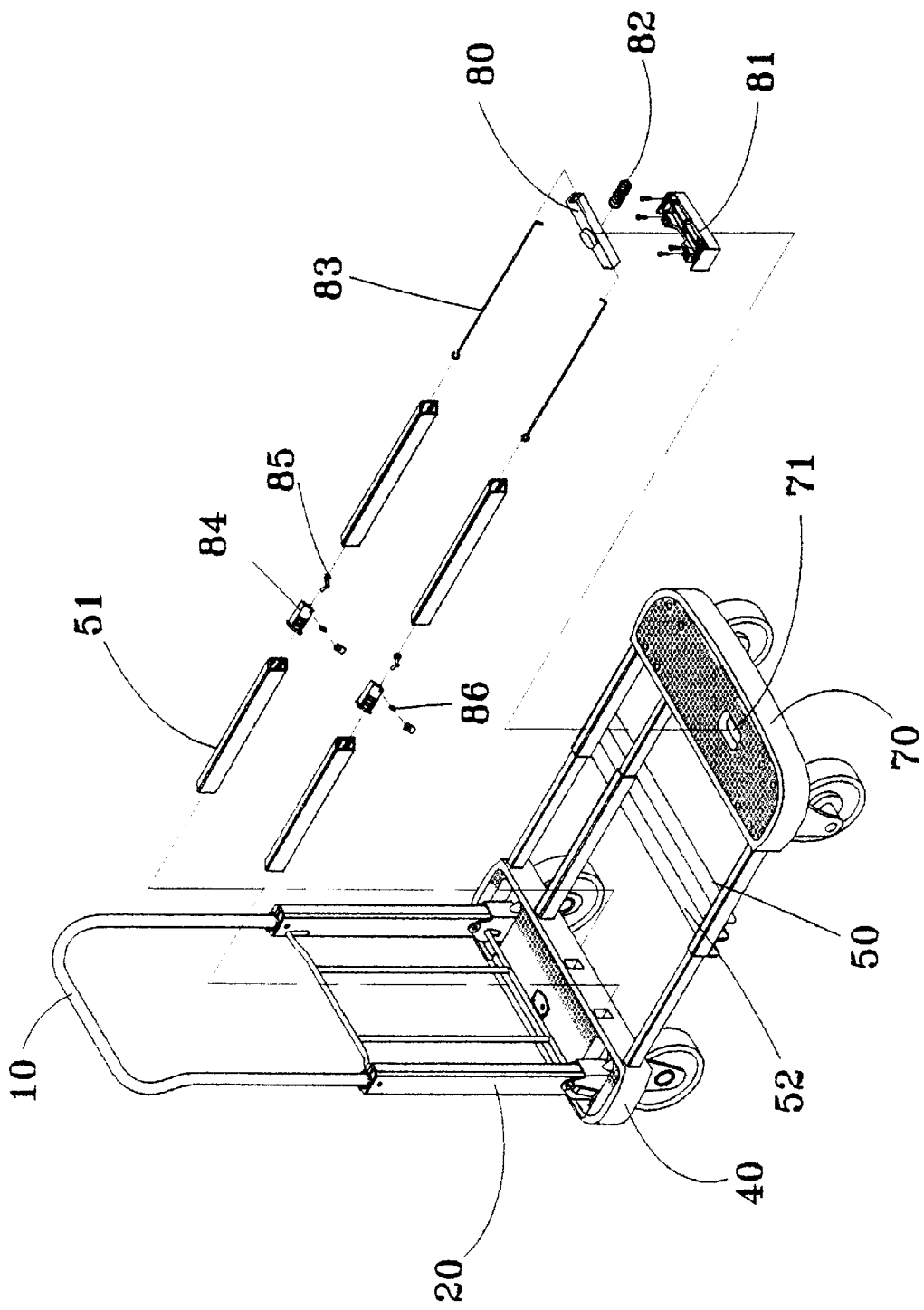
FIG. 5 is a partial exploded perspective view showing the exploded parts of the loading stage for adjusting its size according to the present invention.

Referring to FIG. 5, it is the exploded view of parts for adjusting the size of the loading stage according to the present invention, wherein the control unit for adjusting the size of the loading stage consists of the push button base 81, the push button 80, the spring 82, the connecting rods 83, and the positioning stoppers 84, these components form part of the loading stage. The push button base 81 provides a place for the spring 82 and the push button 80 to combine together, which are installed inside a square slot 71 provided on the front mounting 70. One end of each of the two connecting rods 83 is attached to a follower 85 through an inner part of the square bushing 51. There are several positioning holes formed on the square bushing 51 for positioning. When it is desired to adjust the size of the loading stage to meet the different requirements of the loads, press down the push button 80 in the square slot 71 provides on the front mounting 70 for removing the connecting rod 83 onwards, which results in a displacement of the follower 85 the plunger 86 to be released from its original position in one of the positioning holes provided on the square bushing 51. Consequently, the loading stage is free to adjust its size.

Moreover, the pressing rod 25 for stretching, retracting and folding the handle bar 10 and adjusting the size of the loading stage can be formed of two or more than two position for controlling and necessarily in a whole.

The construction members between the front and mountings may utilize several number of square bushings. Besides the front and back mountings are made of engineering plastic material or other appropriately equivalent materials which are able to reduce the cart weight. Furthermore the front and back mountings are formed in one piece which is superior to conventional cart mountings formed of complicated components in mechanical strength, and easy for assembling with lower production cost.

Many changes and modifications in the above described embodiment of the invention can of course be carried out without departing from the scope thereof. Accordingly, to promote the progress in science and the useful arts, the invention is disclosed and is intended to be limited only by the scope of the appended claims.

What is claimed is:

1. A stretchable and foldable cart, comprising
   a loading stage which comprises a front and a back mounting, a pair of fixed caster holders for rotatably mounting two casters underneath said back mounting, a pair of swiveling caster holder for rotatably mounting another two casters underneath said front mounting, a plurality of square bushings extensibly connected between said front and back mountings, two lateral rods transversely connected under said square bushings so as to support said front and back mountings, and a control unit for adjusting a distance between said front and back mountings by selectively adjusting a length of each of said square bushings, wherein said control unit comprises a push button base installed in a square slot provided on said front mounting, a push button placed inside said push button base, a spring disposed between said push button base and said push button, two connecting rods, and two positioning stoppers, wherein one end of each of said two connecting rods is attached to each side of said push button while another end of each of said two connecting rods is attached to a follower through an inner part of one of said sqaure bushings, thereby to adjust said distance between said front and back mountings, press down said push button in said square slot provided on said front mounting for removing said connecting rods onwards, resulting in a displacement of said followers and causing two plungers, which are equipped with said two followers through two positioning stoppers respectively, to be released from an original position thereof and engaged with said square bushings respectively; and
   a handle bar unit which comprises two bushing bases spacedly affixed on of said back mounting, two bushings, two positioning stoppers, two lug bases, a pressing rod supported between said two bushings, and a handle bar, each of said bushings has an upper end engaged with one of said lug bases while a lower end of each of said bushings is engaged with one of said two positioning stoppers, wherein said two positioning stoppers are pivotally mounted on said two bushing bases and said handle bar has two ends penetrate through said two lug bases, wherein said pressing rod comprises a lower rod having two ends connected to two recessed slots provided on said two bushing base respectively and an upper rod having two ends connected two positioning elastic lug provided on said two lug bases resepctively, wherein by pressing down said pressing rod, said positioning elastic lugs are pressed by said upper rod, so that a positioning pin protruded from each said end of said handle bar and connected to a terminal of said positioning elastic lug is forced to trip out of a fixed position thereof for allowing said handle bar to stretch or retract, moreover said lower rod of said pressing rod is forcibly pulled upwards, and two ends of said lower end are respectively pulled into two recess slots provided on said two positioning stoppers installed at said two lower ends of said two bushings by a resilient force of said two springs which are mounted between said two ends of said lower rod and said two bushing bases respectively, so that in order to fold up said handle bar and said bushings, by pressing said pressing rod down, said lower rod is separated from said recess slots of said position stopper and said handle bar unit is released and said bushings are freee to fold forwards with respect to said bushing bases as two supporting points respectively.

* * * * *